United States Patent [19]

Sinha et al.

[11] Patent Number: 5,398,215
[45] Date of Patent: Mar. 14, 1995

[54] IDENTIFICATION OF STRESS INDUCED ANISOTROPY IN FORMATIONS

[75] Inventors: Bikash K. Sinha, West Redding; Sergio Kostek, Ridgefield, both of Conn.

[73] Assignee: Schlumberger Technology Corporation, Ridgefield, Conn.

[21] Appl. No.: 225,016

[22] Filed: Apr. 8, 1994

Related U.S. Application Data

[63] Continuation-in-part of Ser. No. 154,645, Nov. 19, 1993.

[51] Int. Cl.6 .............................................. G01V 1/40
[52] U.S. Cl. ...................... 367/31; 367/27; 367/32; 364/422
[58] Field of Search ................. 367/27, 31, 32; 364/422; 181/105

[56] References Cited

U.S. PATENT DOCUMENTS

| | | | |
|---|---|---|---|
| 4,964,101 | 10/1990 | Lui et al. | 367/31 |
| 5,060,203 | 10/1991 | Winterstein | 367/31 |
| 5,060,204 | 10/1991 | Winterstein | 367/31 |
| 5,142,501 | 8/1992 | Winterstein | 367/421 |
| 5,214,613 | 5/1993 | Emerson | 367/31 |

OTHER PUBLICATIONS

S. Kosfield, PhD thesis; MIT; Driss Abst. Int., Sect. B, vol. 54, No. 6, pp. 2959-B Dec. 1993.
Winkler et al., Gegibrysis, vol. 54, #1, pp. 66-75, Jan. 1989.
Mueller, M. C. Proc. Geophys. J. Int. vol. 107, #3, pp. 409-415, Dec. 1991.
Nicolitis et al., Gegibysics, vol. 55, #2, pp. 167-175; Feb. 1990.

*Primary Examiner*—Nelson Moskowitz
*Attorney, Agent, or Firm*—David P. Gordon; Leonard W. Pojunas

[57] ABSTRACT

Low and high frequency flexural waves or their equivalents are generated with dipole or other source transducers. From measurements made at receiving transducers which are oriented at two orthogonal directions in a horizontal plane normal to the borehole axis, and via known processing techniques, the received signals are transformed into arrivals as a function of frequency such that the principal polarization directions and the magnitudes of the maximum and minimum wave velocities at those directions are determined at different frequencies. If the maximum velocity of the relatively low frequency flexural waves are in a first principal polarization direction, and the maximum velocity of the relatively high frequency flexural waves are in a second principal polarization direction which is substantially normal to the first principal direction, uniaxial stress in the formation is attributed to stress induced azimuthal anisotropy as opposed to an instrinsic anistropy in the formation. Then, the low frequency information can be utilized to obtain a value for a formation shear stress parameter such as $c_{456}T_{23}^{max}/c_{66}$, where $c_{456}$ is a third order elastic constant of the formation in Voigt notation $c_{66}$ is the formation shear modulus and $T_{23}^{max}$ is the magnitude of the formation shear stress in a direction forty-five degrees from the maximum far-field compressive stress direction.

26 Claims, 7 Drawing Sheets

LOW FREQUENCY

HIGH FREQUENCY

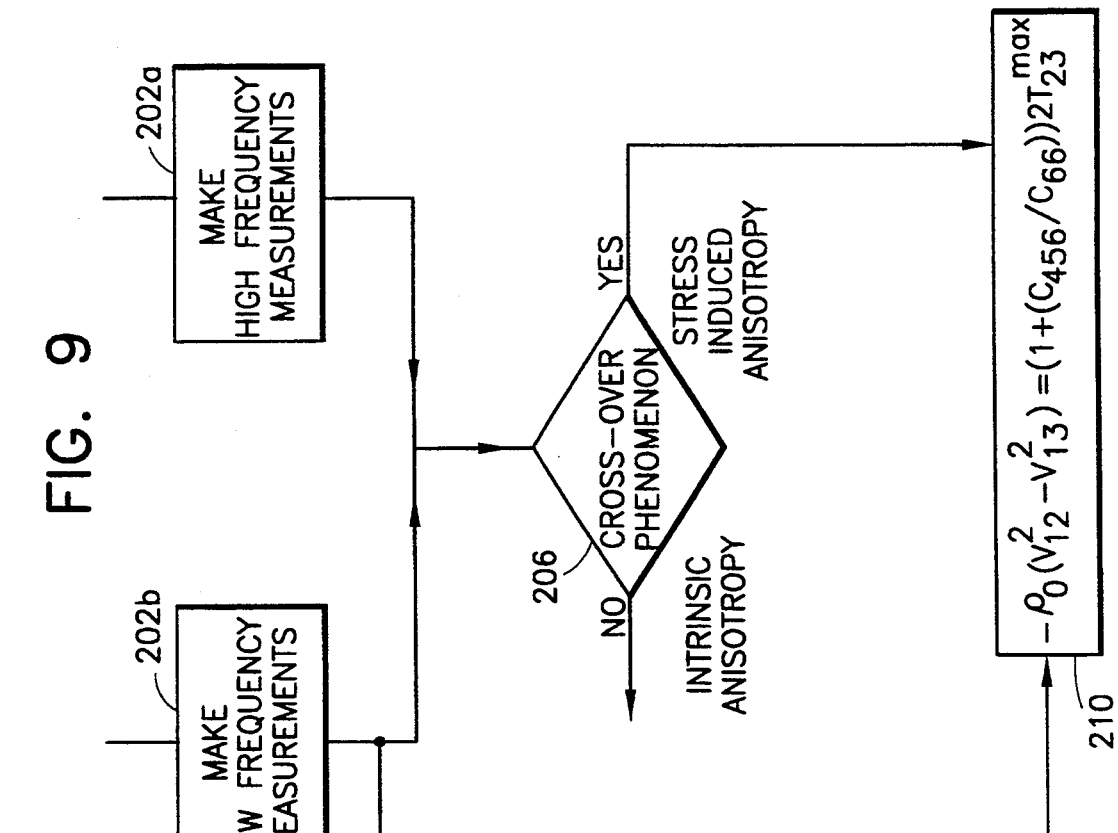
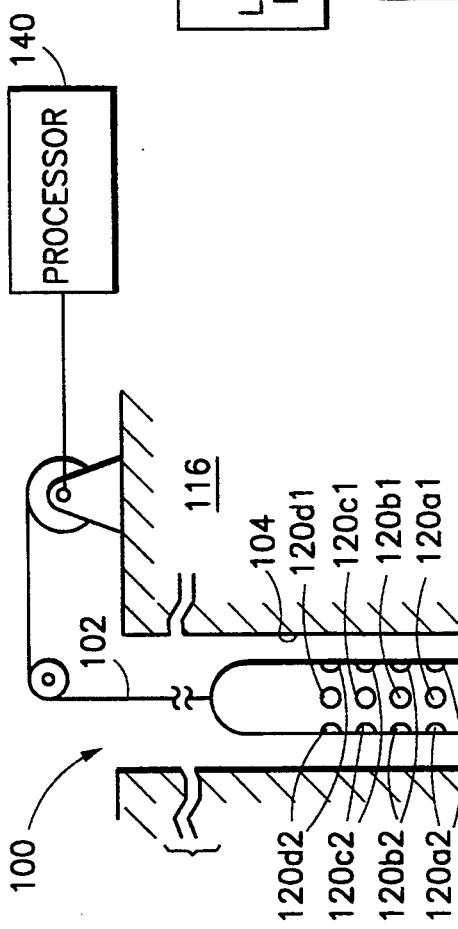

IDENTIFICATION OF STRESS INDUCED ANISOTROPY IN FORMATIONS

This is a continuation-in-part of co-owned U.S. Ser. No. 08/154,645, filed Nov. 19, 1993, and is related to co-owned U.S. Ser. No. 08/220,717, entitled "Borehole Apparatus and Methods for Measuring Formation Velocities as a Function of Azimuth", both of which are hereby incorporated by reference herein in their entireties.

BACKGROUND OF THE INVENTION

1. Field of the Invention

The present invention relates broadly to methods and apparatus for investigating subsurface earth formations. More particularly, this invention relates to borehole tool and methods which utilize flexural waves or their low and high frequency equivalents for measuring formation parameters from which stress induced anisotropy in the formation can be identified.

2. State of the Art

Detailed knowledge of geological formation stresses is desirable in the oil production business, as formation stress determination can affect the planning of stimulation treatments for enhanced oil recovery, as well as provide predictions of sanding and well-bore stability. As a result, there is a growing demand in the art for in situ estimations or determinations of formation stresses. In fact, such in situ determinations can also prove useful with respect to determining the long term stability of the formation and thus the suitability of the formation as a repository for waste disposal.

The stress state of a formation can be completely characterized by the magnitudes and directions of three principal stresses. Generally, the overburden pressure at a given depth in the formation yields the prinicipal stress in the vertical direction. Consequently, identification of the two principal stresses in the horizontal plane is of practical importance.

To date, it has not been possible to make in situ measurements of the stresses in a formation based on acoustic measurements. What has been possible, as suggested by U.S. Pat. No. 4,794,572 to Sondergeld et al. is to use an acoustic borehole tool using a dipole source such as is found in the DSI (dipole shear imager) tool of Schlumberger (see U.S. Pat. Nos. 4,862,991 and 4,850,450 to Hoyle et al., and A. R. Harrison, et al. SPE 20557, pp. 267-282, 1990) to make measurements of formation anisotropy. According to that invention, the tool with the dipole source is used in its normal relatively low frequency mode (e.g., having a spectrum located somewhere between 1 and 4 KHz) to measure formation anisotropy by measuring velocity of two orthogonal dipole modes. As is accepted in the art, the velocities of the two dipole modes measured by the tool are sensitive to the formation anisotropy (including far-field formation stress), with the fast dipole mode directed along the direction of maximum stress, and the slow dipole mode orthogonal to the fast dipole mode. However, formation anisotropy can stem from several sources, including: instrinsic anisotropy due to microstructures such as is often found in shales; formation lithology such as in layered or dipping beds; aligned fractures; and stress induced anisotropy, such as might be due to uniaxial or biaxial stresses in the formation which result from plate tectonic forces. With the techniques of the prior art, it is not possible to distinguish among the-various sources of formation anisotropy, and in particular to distinguish the stress induced anisotropy from the other sources of formation anisotropy. Thus, even though a measurement of formation anisotropy is suggested by U.S. Pat. No. 4,794,572, that measurement has not been usable to measure formation stress.

SUMMARY OF THE INVENTION

It is therefore an object of the invention to provide methods and apparatus for measuring stress induced azimuthal anisotropy in an earth formation.

It is a further object of the invention to utilize dispersion curves for detected low and high frequency flexural waves which were generated by one or more dipole sources in a borehole in order to identify stress induced anisotropy in the formation.

It is another object of the invention to utilize low frequency velocities determined by processing information received at the dipole receivers in order to determine formation parameters which relate to the stress and nonlinearity of the formation.

In accord with the objects of the invention, relatively low and relatively high frequency flexural waves or their equivalents are generated with dipole or other source transducers. From the measurements (e.g., waveform amplitude vs. time) made at the receiving transducers which are oriented at two orthogonal directions in a horizontal plane normal to the borehole axis, and via processing such as by Prony's method, the received signals are transformed into arrivals (e.g., dispersive flexural) as a function of frequency such that the principal polarization directions and the magnitudes of the maximum and minimum (flexural) wave velocities at those directions are determined at different frequencies. According to the invention, if the maximum velocity of the relatively low frequency flexural waves are in a first principal polarization direction, and the maximum velocity of the relatively high frequency flexural waves are in a second principal polarization direction, (i.e., the relative magnitudes of the wave velocities for the fast and slow dipole source directions reverse for the low and high frequencies) the uniaxial stress in the formation is attributed to stress induced azimuthal anisotropy as opposed to an instrinsic anisotropy in the formation. Support for this attribution is found in the realization that the borehole disturbs and actually reverses the stress fields in the formation such that the stress fields near the borehole have maxima and minima in directions normal to that of the far stress fields (e.g., see previously incorporated U.S. Ser. No. 08/154,645, and that the low frequency waves are indicative of the far-field stress, while the high frequency waves are indicative of the near-field stress.

According to another aspect of the invention, once the anisotropy of the formation is attributed to stress in the formation, the low frequency information can be utilized to obtain a value for a formation shear stress parameter which is an indicator of impending rock failure. The preferred formation shear stress parameter is $c_{456} T_{23}^{max}/c_{66}$, where $c_{456}$ is one of the third-order elastic constants of the formation (in Voigt notation —see K. Brugger, "Thermodynamic Definitions of Higher Order Elastic Coefficients," *Physical Review*, Vol 133, No. 6A, pp. A1611–A1612, 16 Mar., 1964; and R. N. Thurston and K. Brugger, "Third Order Elastic Constants and the Velocity of Small Amplitude Elastic Waves in Homogeneously Stressed Media", *Physical Review*, Vol. 133, No. 6A, pp. A1604–A1610, 16 Mar.

1964), $c_{66}$ is the shear modulus of the formation in the assumed reference state, and $T_{23}^{max}$ is the magnitude of the formation shear stress in a direction forty-five degrees from the maximum far-field compressive stress direction. It should be appreciated that the shear velocity measurements are obtained from the low frequency limits of the flexural wave measurements as the flexural wave velocity asymptotes at low frequency to the shear wave velocity.

Additional objects and advantages of the invention will become apparent to those skilled in the art upon reference to the detailed description taken in conjunction with the provided figures.

BRIEF DESCRIPTION OF THE DRAWINGS

FIG. 8 is a schematic diagram of the preferred apparatus of the invention.

FIG. 9 is a flow chart of the preferred method of the invention.

DETAILED DESCRIPTION OF THE PREFERRED EMBODIMENTS

It has been well known for some time that earth formations are subject to stresses which can take a preferred direction. Because these stresses take a preferred direction, the formation may be viewed as having a uniaxial stress in that preferred direction superimposed on an isotropic stress that does not vary with direction. If it is assumed that the formation under a uniaxial stress behaves elastically, then existing equations can be used to describe the stresses which occur around a circular borehole. In particular, the circumferential stress T, which results from the drilling of a borehole in a formation is defined according to:

$$T_{\phi\phi} = S/2\{[1+(a^2/R^2)] - [1+(3a^4/R^4)]\cos 2\phi\}$$

where S is the magnitude of the applied stress, "a" is the borehole radius, R is the radial distance into the formation from the center of the borehole, and $\phi=0$ is the direction of the applied stress. Using equation (1) above, the circumferential stress is plotted as a function of borehole azimuth in FIG. 1, where the circumferential stress is due to a unit uniaxial stress applied perpendicular to the borehole. As is seen in FIG. 1, the circumferential stress is highly compressive along $\phi=90°$ and 270°, and tensile (being shown by shading) near the borehole along $\phi=0°$.

Figure 1:
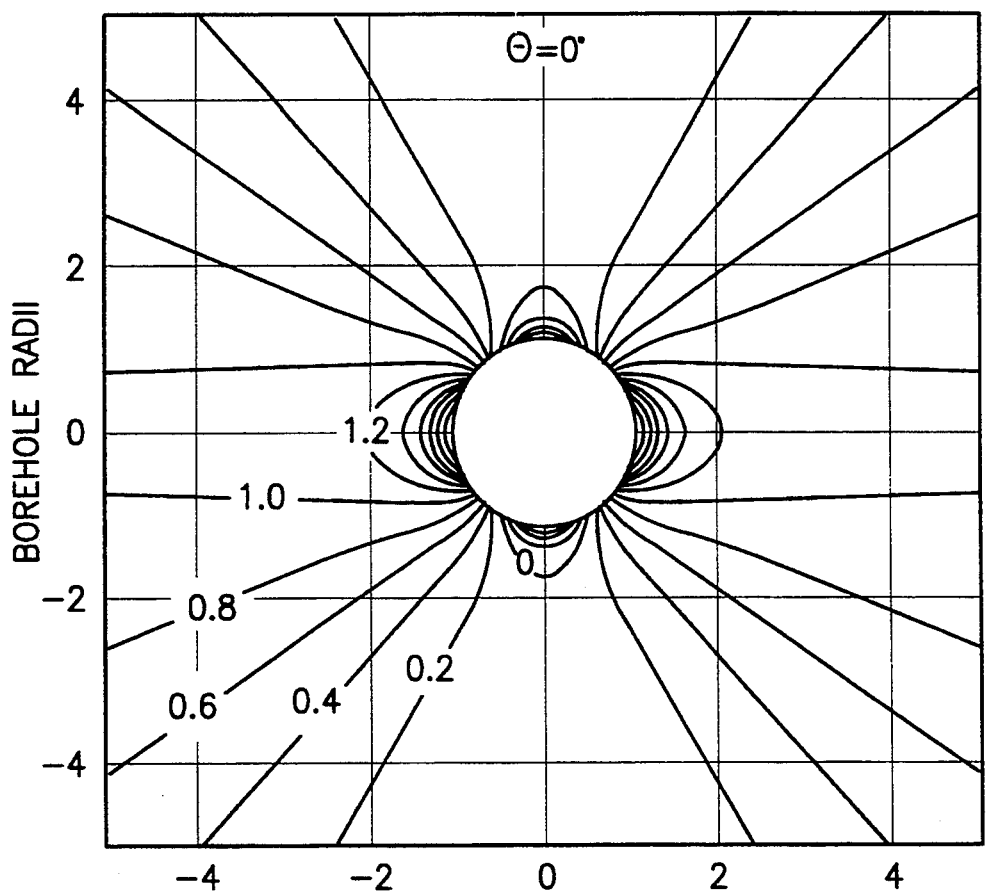
FIG. 1 is a plot of circumferential stress as a function of borehole azimuth, where the circumferential stress is due to a unit uniaxial stress applied perpendicular to the borehole.
Figure 2:
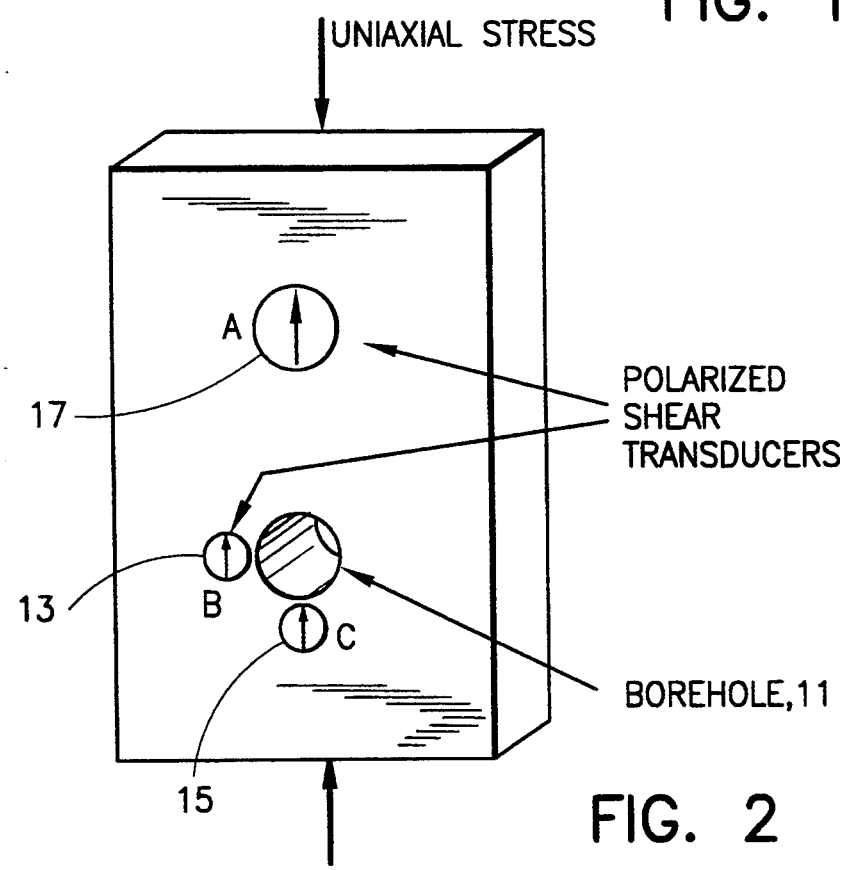
FIG. 2 is a schematic diagram of a test arrangement in a Berea sandstone provided to show that velocity in the sandstone varies as uniaxial stress is applied to the sandstone.
Figure 3:
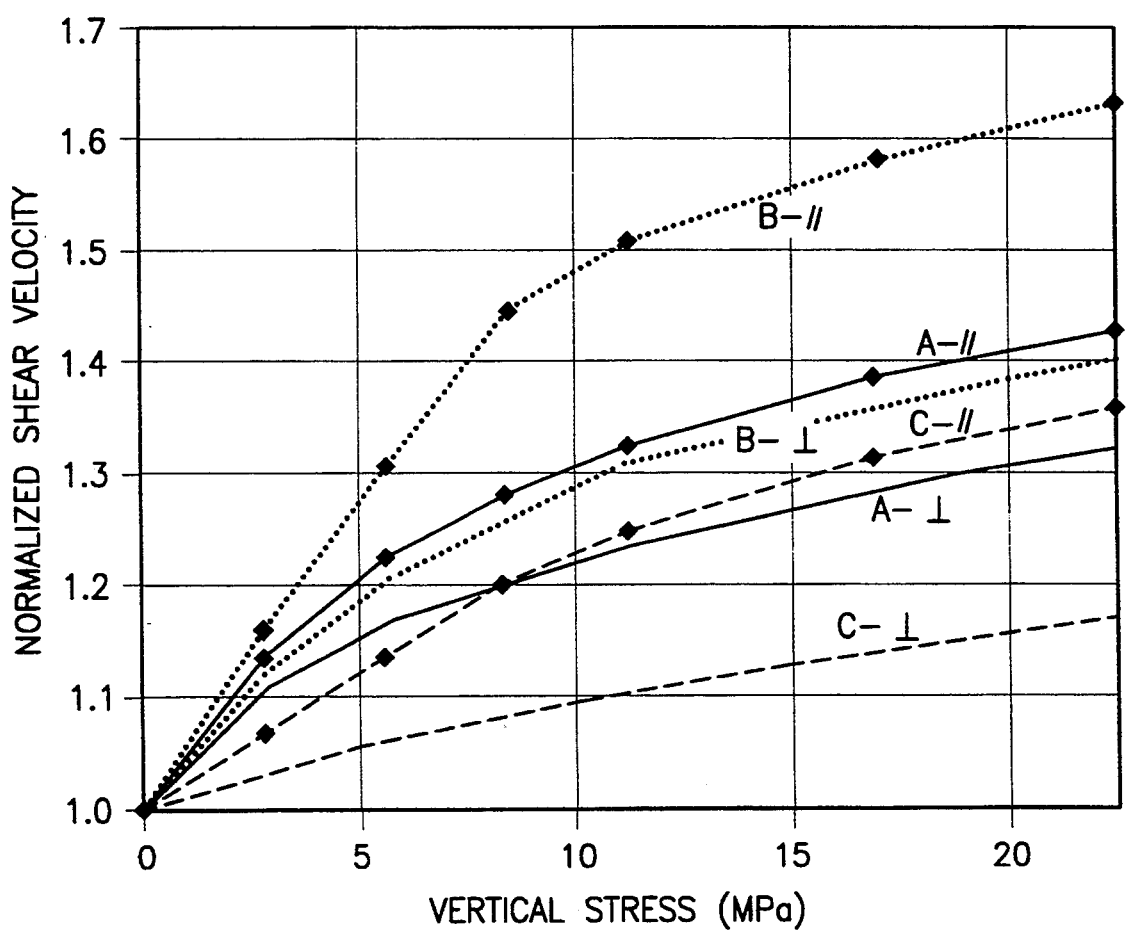
FIG. 3 is a plot showing the results of experiments conducted with the arrangement of FIG. 2.

Based on FIG. 1, it would appear that a relative uniaxial stress (superimposed on any isotropic stress) might produce measurable changes in velocity with azimuth in earth (rock) formations. To test this thesis, a Berea sandstone sample was obtained and as shown in FIG. 2, a borehole type hole 11 was cut through the sample. Ultrasonic shear wave transmitters 13, 15, and 17 were placed at different locations at near-borehole locations (B and C) and at a far location (A) in the block, with corresponding receivers (not shown) on the back face of the block. A uniaxial stress was applied to the end of the block, and velocity measurements were made at each location as stress was increased. In a first experiment, all transducers were polarized perpendicular to the uniaxial stress direction, while in a second experiment, all transducers were polarized parallel to the stress direction. The resulting velocity measurements are shown in FIG. 3 where each curve has been normalized for the effect of the inherent anisotropy of the sandstone on the velocity, which information was obtained by running an experiment at zero uniaxial stress. As seen in FIG. 3, the velocities measured at the different locations are quite different from each. For a given polarization (parallel or perpendicular), the velocities obtained were greatest at location B due to the high circumferential stress concentrations (as would be suggested by the relation of location B to the stresses predicted in FIG. 1). Likewise, the velocities detected at location C were the smallest due to the induced tensile stresses (see FIG. 1). In fact, in some rocks subjected to the above testing, it has been observed that the velocity can decrease at location C as stress is increased.

With shear velocities being affected by the uniaxial stress of the formation, it might be expected that flexural wave velocities might also be affected. As will be set forth in detail below, the manner in which the flexural wave velocities are affected is utilized to help distinguish between stress-induced anisotropy and other anisotropy in the formation. However, before setting forth test results and resulting methodology of the invention, the theory which is believed to underly the invention is set forth.

The propagation of small amplitude waves in homogeneous and anisotropic solids is governed by the linear equations of motion. However, when the solid is prestressed, the propagation of such waves are properly described by equations of motion for small dynamic fields superposed on a static bias. A static bias represents any statically deformed state of the medium due to an externally applied load or residual stresses. These equations are derived from the rotationally invariant equations of nonlinear elasticity by making a Taylor expansion of the quantities for the dynamic state about their values in the biasing (or intermediate) state (see B. K. Sinha and H. F. Tiersten, "On the Influence of a Flexural Biasing State on the Velocity of Piezoelectric Surface Waves" *Wave Motion* 1, pp. 37-51 (1979); and B. K. Sinha, "Elastic Wave in Crystals Under a Bias", *Ferroelectrics* 41, 61-73 (1982). These equations for small field superposed on a large bias properly account for changes in the effective elastic stiffnesses, mass density and path length between two observation points due to the biasing stresses, and predict the resulting changes in the acoustic wave velocities. The dependence of the acoustic wave velocity on biasing stresses in the propagating medium is referred to as the acoustoelastic phenomenon.

When the biasing stresses in the formation are inhomogeneous, the effective elastic constants as well as the mass density are position dependent. In this situation, a perturbation procedure such as set forth in Sinha, B. K. and H. F. Tiersten, "On the Influence of a Flexural Biasing State on the Velocity of Piezoelectric Surface Waves", *Wave Motion*, 1 pp. 37–51 (1979) can readily treat spatially varying biasing stresses such as those due to a nonuniform radial stress distribution away from the borehole, and the corresponding changes in the Stoneley and flexural wave velocities can be calculated as a function of frequency. For a given wavenumber $k_z$, the first order perturbation in the eigenfrequency $\omega m$ can be given by:

$$\omega_m' = \frac{\int_V K_{L\gamma}^{NL} \mu_{\gamma,L}^m dV}{2\omega_m \int_V \rho_0 \mu_\gamma^m \mu_\gamma^m dV}, \tag{2}$$

where $$K_{L\gamma}^{NL} = c_{L\gamma M\nu} \mu_{\nu,M}, \tag{3}$$

$$c_{L\gamma M\nu} = T_{LM}\delta_{\gamma\nu} + c_{L\gamma M\nu AB} E_{AB} + c_{L\gamma KM}\omega_{\nu,K} + c_{LKM\nu}\omega_{\gamma,K}, \tag{4}$$
$$\tag{5}$$

$$T_{LM} = c_{LMRS}\omega_{R,S}, \tag{6}$$

$$E_{AB} = \frac{1}{2}(\omega_{A,B} + \omega_{B,A}).$$

as described in detail in Sinha, B. K. "Elastic Waves in Crystals Under a Bias" *Ferroelectrics*, 41 pp. 61–73 (1982), where the superscript "NL" denotes a nonlinear Piola-Kirchhoff stress tensor, the quantities $c_{L\gamma M\nu}$ and $c_{L\gamma M\nu AB}$ are second and third order elastic constants, $T_{LM}$, $E_{AB}$, and $w_{\gamma,k}$ denote the biasing stresses, strains, and static displacement gradients respectively, $K_{L\gamma}^{NL}$ are the perturbations in the Piola-Kirchhoff tensor elements from the linear portion $K_{L\gamma}^L$ for the reference isotropic medium before the application of any biasing stresses, $\rho$ is the mass density of the propagating medium, $u_\gamma^m$ represents the eigen-solution for the reference isotropic medium for a selected propagating mode in the absence of assumed reference state, the index m refers to a family of normal modes for a borehole in an isotropic medium, and $\omega'_m$ are the frequency perturbations of the eigen-frequency $\omega_m$. In equations (2)–(6), a Cartesian tensor notation is used, as well as the convention that a comma followed by an index denotes differentiation. The summation convention for repeated tensor indices is also implied.

At this point, it is important to understand the definition of reference state. The in-situ formation stresses at a given depth can be decomposed into two stress states: a hydrostatically loaded confining pressure of a magnitude given by the overburden pressure at that depth; and a biaxial stress state in the horizontal plane normal to the vertical overburden pressure. The biaxial stresses are the perturbations from the hydrostatically loaded reference state. The linear (second-order elastic) as well as nonlinear (third-order elastic) constants are defined with respect to this isotropic reference state. An isotropic medium subject to a hydrostatic pressure remains isotropic and thus serves as a convenient reference state for subsequent analysis of acoustic wave propagation in an arbitrarily prestressed state of the formation.

It is relatively straight-forward to estimate the overburden pressure at a given depth of interest by integrating the formation mass density from the surface to that depth. The linear elastic constants of the formation referred to this reference state can be readily estimated from compressional and shear wave velocity measurements in a laboratory on a rock sample subjected to a confining pressure of magnitude given by the overburden pressure. The formation rock sample can be obtained from a standard coring operation.

It should be noted that the present position of material points may be written as $$y(X,t) = X + w(X) + u(X,t) \tag{7}$$

where W denotes the displacement due to the applied static loading of material points with position vector X in the unstressed configuration, and u denotes the small dynamic displacement vector of material points above and beyond that due to the static deformation. The small field Piola-Kirchhoff stress $K_{L\gamma}$ can be decomposed into two parts $$K_{L\gamma} = K_{L\gamma}^L + K_{L\gamma}^{NL} \tag{8}$$

where $$K_{L\gamma}^L = c_{L\gamma M\nu} u_{\nu,M}^m \tag{9}$$

with $K_{L\gamma}^{NL}$ being defined by equations (3) and (4) above, and the superscripts "L" and "NL" denoting the linear and nonlinear portions of the stress tensor. The procedure for obtaining the modal solution $u_\gamma^m$ in the assumed, isotropic reference state is known in the art (See, e.g., A L Kurkjian et al., "Acoustic Multipole Sources in Fluid-Filled Boreholes", *Geophysics* 51, No. 1 pp. 148–163 (1986)).

Figure 4A:
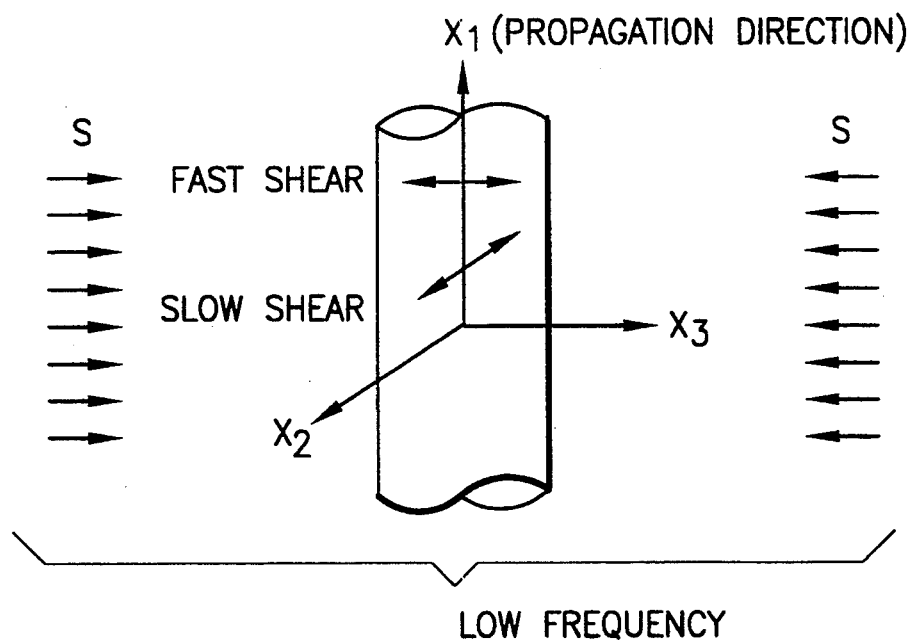
FIGS. 4a and 4b are a schematic diagram and a plan view of a borehole which is subjected to a uniaxial compressive stress.

Turning to FIG. 4a, a schematic diagram of a borehole 31 of radius a is seen as subjected to a uniaxial compressive stress along a given direction in the horizontal plane. Also shown are directions of polarizations for the fast and slow flexural waves propagating along the borehole axis which, based on the theoretical model set forth above, result from the activation of a dipole source. It should be noted that the theory of wave propagation along a borehole in a formation subject to a uniaxial stress as described by equations (1)–(9) above predicts that the fast shear wave polarization is parallel to the far-field uniaxial tectonic stress direction ($x_3$), while the slow shear wave polarization lies in the perpendicular direction ($x_2$).

Figure 4B:
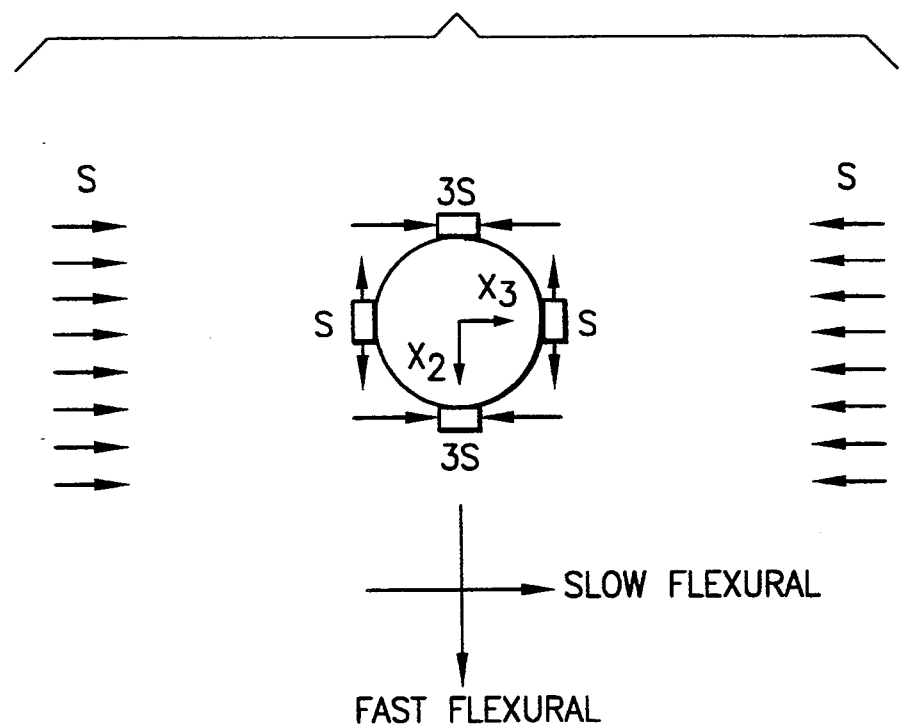
Figure 5A:
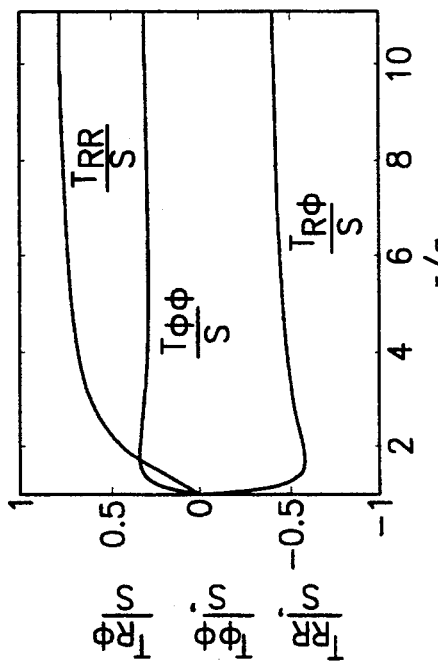
FIGS. 5a-5d are plots of radial, hoop, and radial-azimuthal stress variations as a function of distance away from the borehole at azimuthal angles of zero, thirty, sixty, and ninety degrees away from the stress axis.
Figure 5C:
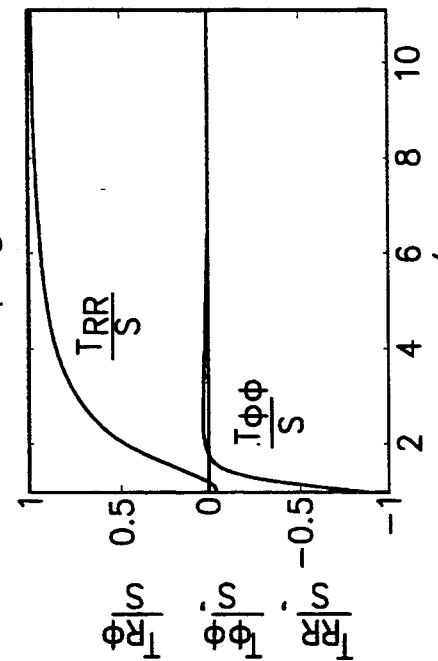
Figure 5B:
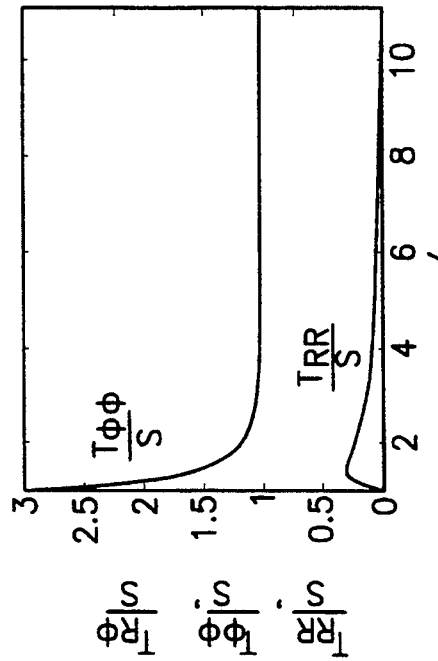
Figure 5D:
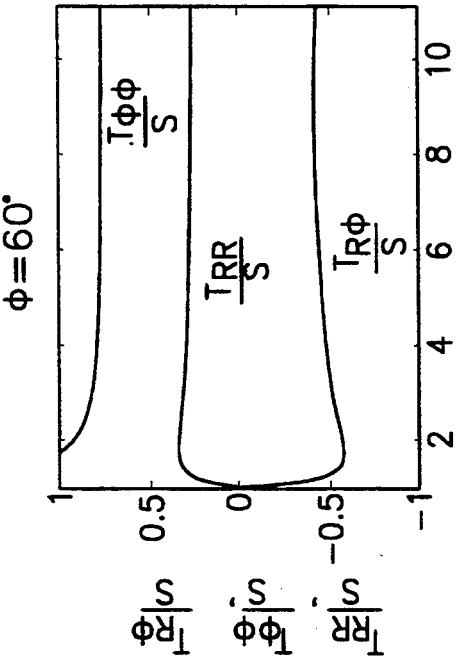

The borehole 31 of FIG. 4a is seen in plan view in FIG. 4b, where the dominant stresses are seen along the principal directions in the vicinity of the borehole. It should be noted that the aforementioned theory also predicts that the high frequency flexural waves (e.g., above approximately 9 KHz in an eight inch diameter borehole) are primarily influenced by these near-field stresses around the borehole, and that the radial polarization of the fast flexural wave is normal to the far-field uniaxial tectonic stress direction (i.e., in the direction $x_2$).

Computational results have been obtained for the flexural wave dispersion curves for a fluid-filled borehole surrounded by an initially isotropic formation. In a first set of calculations, the usual prior art assumption was made that there are no biasing stresses in the formation, while in a second set of calculations it was assumed that the formation was subjected to a uniaxial compressive stress S along a given direction in the azimuthal plane. Drilling of a borehole alters the stress distribution in the vicinity of the borehole. The altered stress distributions can be obtained from the static equations of equilibrium which assume the following form in the absence of any static borehole pressure (see Timoshenko, E. P. and J. N. Goodier, *Theory of Elasticity;* 3rd Ed. pp. 90–93, McGraw Hill, New York, (1982):

$$T_{RR} = \frac{S}{2}\left(1 - \frac{a^2}{R^2}\right) + \frac{S}{2}\left(1 + \frac{3a^4}{R^4} - \frac{4a^2}{R^2}\right)\cos 2\phi \quad (10)$$

$$T_{\phi\phi} = \frac{S}{2}\left(1 + \frac{a^2}{R^2}\right) - \frac{S}{2}\left(1 + \frac{3a^4}{R^4}\right)\cos 2\phi \quad (11)$$

$$T_{R\phi} = -\frac{S}{2}\left(1 - \frac{3a^4}{R^4} + \frac{2a^2}{R^2}\right)\sin 2\phi \quad (12)$$

where $\phi$ is the azimuthal angle measured from the far-field uniaxial stress direction, and $T_{RR}$, $T_{\phi\phi}$, and $T_{R\phi}$ are respectively the radial, hoop, and radial-azimuthal shear stresses in the formation. Under the plane strain assumption, the associated biasing strains in the formation are given by:

$$E_{RR} = \frac{1}{2c_{66}}[(1-\nu)T_{RR} - \nu T_{\phi\phi}] \quad (13)$$

$$E_{\phi\phi} = \frac{1}{2c_{66}}[\nu T_{RR} + (1-\nu)T_{\phi\phi}] \quad (14)$$

$$E_{R\phi} = \frac{T_{R\phi}}{2c_{66}} \quad (15)$$

$$E_{\phi\phi} = \frac{P_0 a^2}{2c_{66}R^2}, \; E_{ZZ} = 0, \; E_{ZR} = 0, \; E_{Z\phi} = 0, \quad (16)$$

where $\nu = 0.5 \; (c_{11} - 2c_{66})/(c_{11} - c_{66})$ is the formation Poisson's ratio, and $T_{zz}$ is given by $$T_{zz} = \nu(T_{RR} + T_{\phi\phi}) \quad (17)$$

Using equations (10) through (12), the radial $T_{an}$, hoop $T_{\phi\phi}$, and radial-azimuthal shear $T_{R\phi}$ stress distributions were calculated away from the borehole. As seen in FIGS. 5a–5d which show the stresses at thirty degree intervals around the borehole, all of these stresses exhibit significant variations in the formation in an annulus around the borehole extending up to approximately three to four times the borehole radius. Beyond that annulus, the theory suggests that the only existing stress is the tectonic uniaxial stress. As seen in FIGS. 5a–5d, the radial stress $T_{an}$ vanishes at the borehole surface because it is assumed that there is no static pressure in the borehole fluid. However, it has been found that an increase in the borehole hydrostatic pressure does not introduce any azimuthal dependence of either the Stoneley or flexural wave velocities.

Figure 6:
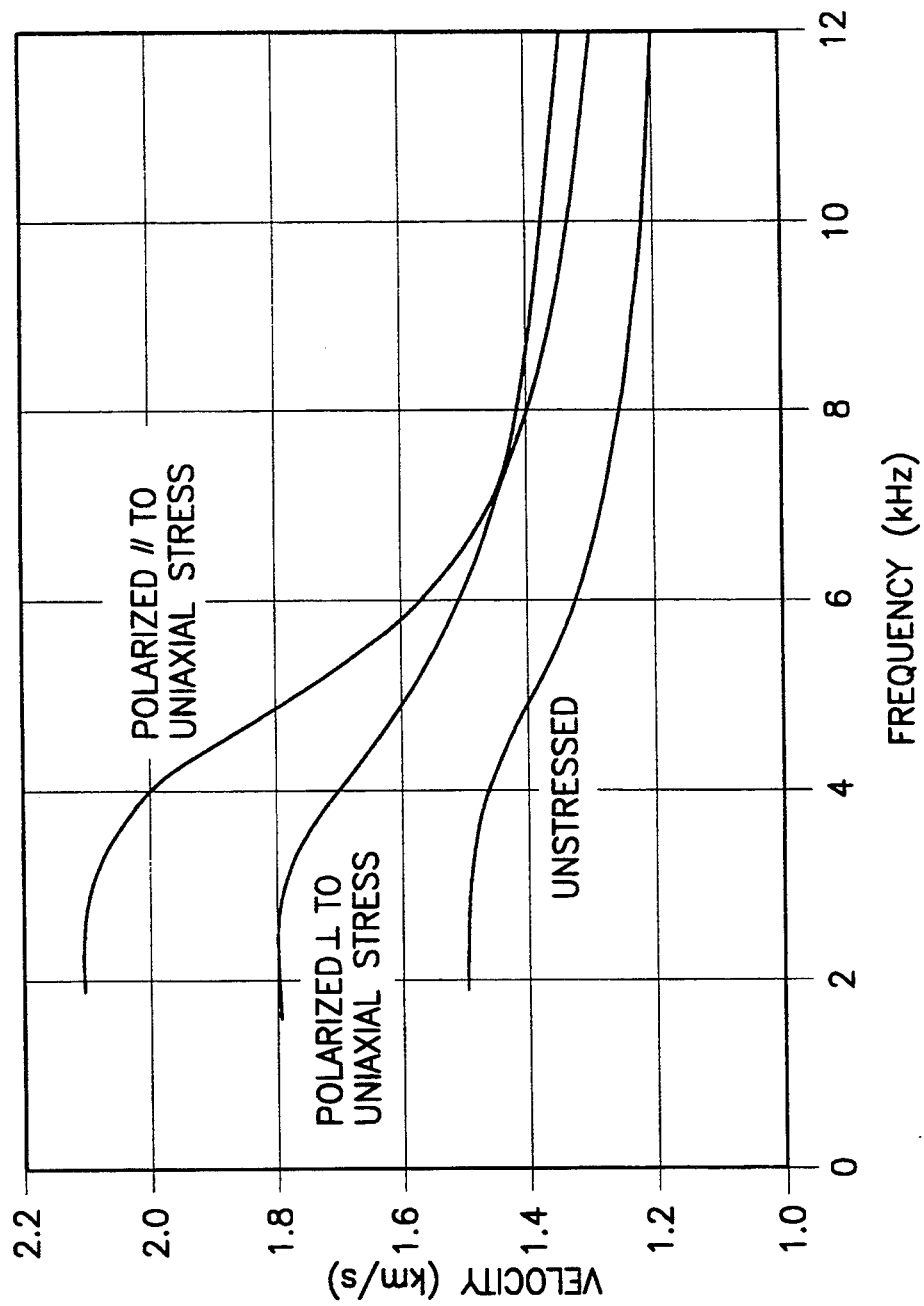
FIG. 6 is a plot of model dispersion curves for flexural waves in a formation with and without uniaxial stress.

Turning to FIG. 6, and using the following parameters (compressional velocity=2320 m/s; shear velocity=1500 m/s; grain density=2650 kg/m$^3$; porosity=22.2%; $c_{111}$=−21200 GPa; $c_{112}$=−13040 GPa; and $c_{123}$=2360 GPa) the flexural wave dispersion curves predicted by equations (1) through (9) together with stresses given by equations (10) through (12) are seen with and without a uniaxial compressive stress of 1450 psi (10 MPa) in the formation. The predictions of FIG. 6 suggest that at low frequencies, with uniaxial stress, the radial component parallel to the uniaxial compressive stress direction will show a flexural wave velocity significantly greater than the velocity of the radial component normal to the stress direction. Indeed, this is what has been assumed by the prior art. See, e.g., S. Crampin, "Evaluation of Anisotropy by Shear Wave Splitting," *Geophysics,* Vol. 50, No. 1 pp. 142–152 (1985). However, as the frequency increases, the flexural wave dispersion curves for the two cases cross each other; and beyond a certain frequency which is believed to be largely dependent on the borehole diameter, the flexural wave velocity corresponding to the radial component normal to the stress direction is predicted to become higher than that for the radial component parallel to the stress direction. This prediction of a reversal in the relative values of the velocities for the two polarization directions has been unknown in the art. However, the prediction is bolstered by an understanding that the uniaxial stress induced azimuthal anisotropy is significantly altered by the drilling of a borehole, and that at high frequencies it is the near-borehole effect (i.e., the altered state) which is measured. It is noted that the reversal of the relative values of the velocities for the two polarization directions has not been seen in any intrinsically anisotropic formations. Thus, if a reversal is detected, it can be assumed that there is a tectonic stress in the formation which is causing the anisotropy. In this manner, uniaxial stress induced anisotropy can be distinguished from other sources of formation anistropy.

Figure 7:
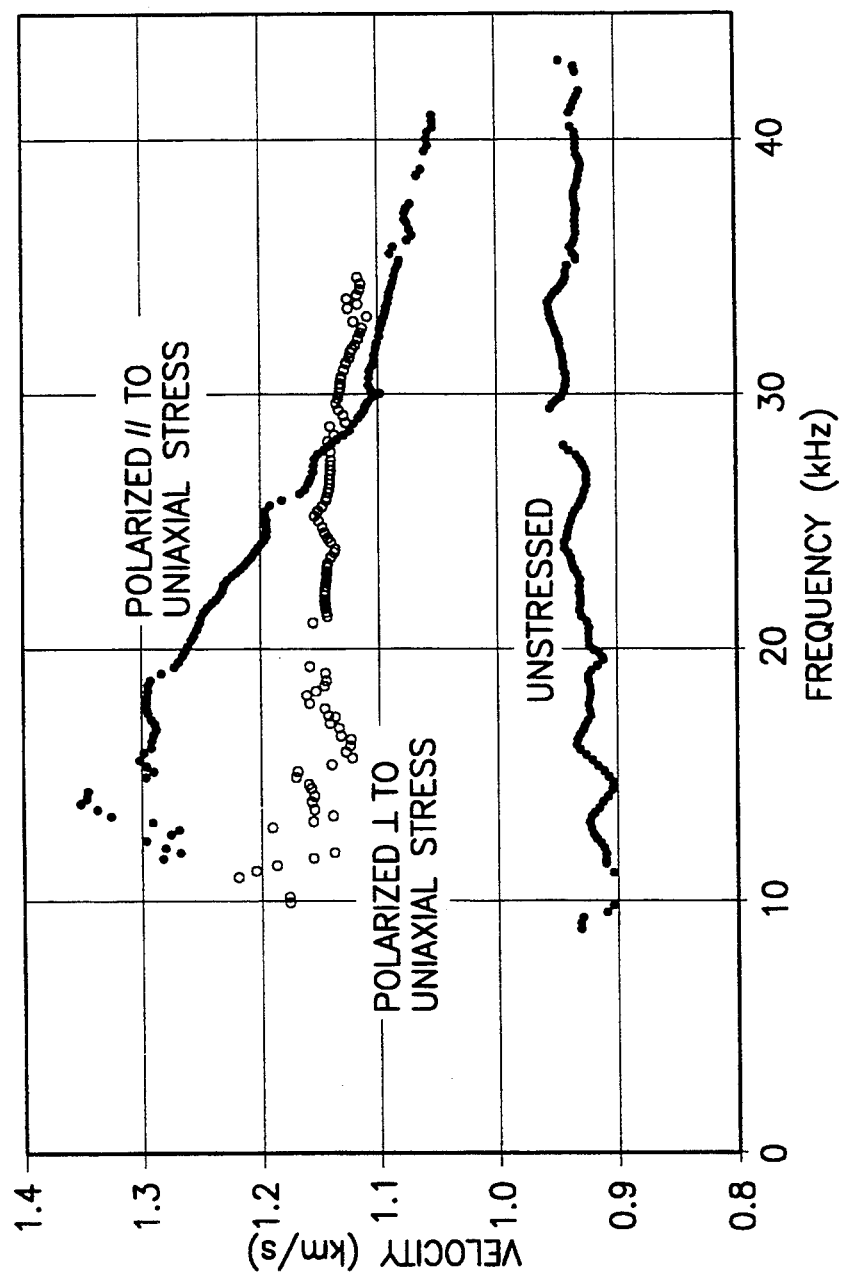
FIG. 7 is a plot, obtained via processing of actual data, of dispersion curves for flexural waves in a test formation with and without uniaxial stress.

In order to confirm the theoretical results which predict a velocity cross-over (seen in FIG. 6), an experiment was performed. A large block of Berea sandstone was provided with a borehole of 3.2 cm diameter, was saturated with water, and was placed in a water-filled tank on a large uniaxial press. The experiment was configured so that stress was applied perpendicular to the borehole axis. A stationary dipole transmitter was placed in the borehole, and a movable dipole receiver was scanned up the borehole. The transducers were aligned either parallel or perpendicular to the uniaxial stress direction, and the resulting wave forms were processed using Prony's method to yield flexural wave dispersion curves. The resulting dispersion curves for the unstressed and stressed states is seen in FIG. 7. As predicted, in the stressed state, a cross-over between the curves is seen, with the faster flexural wave being aligned with the uniaxial stress direction at low frequencies, and being polarized perpendicular to the uniaxial stress direction at high frequencies. It should be noted that the cross-over frequency in the test arrangement was substantially higher than that shown in FIG. 6. However, this result was expected because the diameter of the borehole of the test arrangement was small compared to typical boreholes in the field.

Based on the theory and experiments, and in accord with the invention, the apparatus for identifying stress induced anisotropy in the formation 116 is seen in FIG. 8. The preferred apparatus 100 includes a borehole tool (suspended by a cable 102 in a borehole 104) which has two dipole sources 112, 114 which respectively generate flexural waves at a relatively low and a relatively high frequency, a plurality of dipole receivers 120a1, 120a2, 120b1, 120b2, 120c1, 120c2, . . . , for detecting with radial polarization both parallel and normal to the maximum shear velocity in the formation the flexural waves generated by the dipole sources, and for generating signals related to those received waves, and a processor means 140 coupled to the dipole receivers for generating dispersion curve velocities for the flexural waves with radial polarization parallel and normal to the maximum shear velocity in the formation at the relatively low and relatively high frequencies. The processor means 140 can either generate a velocity versus frequency plot such as shown in FIG. 7 which can be provided in log format, or alternatively, can conduct a simple comparison of the velocities at the radial polarizations to determine whether a velocity cross-over exists. Regardless, if a cross-over is observed, the detected anisotropy is associated with stress in the formation, while if no crossover is observed, the detected anisotropy is associated with non-stress related anisotropy.

In accord with preferred aspects of the invention, the dipole sources 112, 114 (only half of dipole source 114 being seen) of the preferred embodiment of the invention are located othogonally with respect to each other. The preferred dipole sources may be any type provided that they are suitable for shear/flexural wave logging. For example, the sources may be transducers made of piezoelectric ceramics made in benders or cylindrical sections, magnetostrictive transducers, or electrodynamic vibrators, or may be of any other suitable construction. Regardless of the type of dipole source utilized, in order to practice the preferred embodiment of the invention, it is required that certain flexural wave frequencies be excited. In particular, for most borehole sizes, it is desirable that the center frequency of the lower frequency signal be somewhere in the 1.5–3.5 KHz range (and preferably less than 2 KHz), while the center frequency of the high frequency signal be somewhere in the 8–12 KHz range (and preferably more than 9 KHz). The simple criterion for selecting actual frequencies for the lower and higher signals is that the frequencies must be chosen such that if a cross-over occurs, it will be detectable. In fact, the cross-over frequency "f" in Hz for flexural dispersion in a borehole of diameter d (in meters) may be roughly approximated according to:

$$f = (1 \pm 0.5) \; V_{flexure}/d \qquad (18)$$

where $V_{flexure}$ is the flexural wave velocity in meters per second. It should be appreciated that equation (18) is only a rough approximation. However, equation (18) does suggest that the cross-over point f is largely dependent on the diameter of the borehole. Thus, it is believed that a lower frequency of less than 2 KHz with a higher frequency of more than 9 KHz will permit a determination in substantially all commercial boreholes.

To generate such different flexural wave excitation frequencies, it is preferred that two separate sets of source transducers be utilized: a dipole set for the relatively low frequency; and a dipole set for the relatively high frequency. It is also preferred that at least the high frequency dipole source be located close to the borehole wall to ensure that the wave energy is received by the receivers. Typically, in carrying out the invention, the tool carrying the source transducers can be rotated in the borehole so that the source transducers can take different azimuthal positions around the borehole which permits a determination of a maximum velocity orientation.

The dipole receivers $120a1$, $120a2$, $120b1$, $120b2$, $120c1$, $120c2$, ..., of the preferred embodiment of the invention may be any type of dipole transducer which detect pressure gradients or particule vibrations (acceleration, velocity, or displacement). The preferred receiver transducers include dual hydrophones, benders, and electrodynamic transducers which are sensitive in the frequency range of the dipole wave sources (e.g., 1 to 15 KHz), although different detectors could be used for the different frequencies of interest. Because high higher frequency waves need to be detected, it is desirable that the receivers $120a1$, $120a2$..., also be located close to the borehole wall. In order to detect the flexural wave signals in both the fast and slow directions, half of the dipole receivers (i.e., the in-line receivers) are oriented parallel to the source direction, and half of the dipole receivers are oriented normal to the source direction (i.e., the cross-line receivers). Typically, the receivers include an array of four in-line receivers $120a1$, $120b1$, $120c1$, $120d1$, and an array of four cross-line receivers $120a2$, $120b2$, $120c2$, $120d2$. As will be appreciated by those skilled in the art, when the dipole sources are arranged orthogonally, a receiver which is in-line with one dipole source will be cross-line relative to the other dipole source, and vice versa. Regardless, the receivers are preferably arranged on the tool to rotate with the source transducers. Rotation of the dipole source in a given azimuthal plane results in substantially negligible amplitude at the cross-line receivers for only two orthogonal directions which respectively correspond to the fast and slow flexural wave polarization directions.

The processor means 140 may take any of numerous forms such as hard-wired circuitry, firmware, a digital signal processor, a microprocessor, a general purpose computer, etc. According to the preferred embodiment, the time waveforms recorded by the dipole receivers are processed according to Prony's method so that at least the flexural wave arrivals are found as a function of frequency. A detailed description of Prony's method for obtaining various non-dispersive and dispersive arrivals from an array of recorded waveforms is known in the art. See, e.g., S. W. Lang et al., "Estimating Slowness Dispersion from Arrays of Sonic Waveforms", *Geophysics* 52, pp 530–544, (1989) In addition, if desired, the fast and slow shear arrivals, and other arrivals may be found. It should be appreciated that the specific type of processor means and processing utilized is not critical to the preferred embodiment of the invention, provided that the flexural wave velocities at the direction of maximum formation shear velocity and at ninety degrees therefrom are found at the lower and higher frequencies of interest. From a comparison of these velocities, a determination is simply made as to whether a velocity cross-over exists, i.e., whether the anisotropy of the formation is due to stress.

According to another aspect of the invention, and as seen with reference to FIG. 9, when the detected anisotropy can be associated with stress in the formation, a stress parameter of the formation which is a good indicator of impending rock failure can be determined. In particular, after measurement of the high and low frequency flexural wave velocities at 202a and 202b, and an observation of the cross-over phenomenon at 206, the stress parameter $c_{456}^{max}/c_{66}$ can be obtained at 210 from the low frequency flexural wave velocity information substantially according to:

$$\rho(v_{12}^2 - v_{13}^2) = (1 + (c_{456}/c_{66}))2T_{23}{}^{max} \quad (19)$$

where $c_{456} = (c_{111} - 3c_{112} + 2c_{123})/8$ is a third-order elastic constant of the formation, $\rho$ is the known or determinable formation mass density in the assumed reference state, $v_{12}$ and $v_{13}$ are the low frequency velocities for flexural waves propagating along the $x_1$ direction and radial polarizations along the $x_2$ and $x_3$ directions, respectively, and $T_{23}$ being the maximum shear stress magnitude at forty-five degrees relative to the maximum compressive stress. With the magnitude of $c_{456}/c_{66}$ being at least an order of magnitude greater than 1, equation (18) is seen to reduce to $\rho(v_{12}^2 - v_{13}^2) = c_{456} 2T_{23}{}^{max}/c_{66}$. In addition, it should be noted that the flexural wave velocities asymptotically approach shear wave speeds, with polarizations parallel to the radial component of the borehole flexural wave. Thus, the stress parameter $c_{456} 2T_{23}{}^{max}/c_{66}$ can be substantially determined by measuring the shear wave velocities $v_{12,s}$ and $v_{13,s}$ instead of flexural wave velocities. It is believed that the stress parameter $c_{456} 2T_{23}{}^{max}/c_{66}$ is a better indicator of impending rock failure in shear than either the maximum shear stress magnitude $T_{23}$ or the formation nonlinear parameter $c_{456}$ themselves. It is noted that $T_{23}$ equates to one-half the maximum shear stress S in the formation.

While the stress parameter $c_{456} 2T_{23}{}^{max}/c_{66}$ is believed to be an excellent indicator of impending rock failure, the use of additional information such as Stoneley wave velocity dispersion from a monopole source can be used to separate out the uniaxial stress from the nonlinear constants of the formation. In particular, utilizing the fast shear or flexural velocity $v_{13}$ and the slow shear or flexural velocity $v_{12}$ in conjunction with the tube wave velocity $V_{TS}$, a low frequency inversion can be utilized to find the uniaxial stress and the nonlinear constant $c_{456}$. The tube wave velocity $V_{TS}$ is the zero frequency asymptote of the Stoneley velocity dispersion.

Because the flexural wave velocities at low frequencies asymptotically approach shear wave speeds (as discussed above), it will be appreciated by those skilled in the art that the techniques of the present invention for distinguishing between anisotropy due to stress and anisotropy due to other formation characteristics can be carried out by using a monopole source in lieu of the low frequency dipole source. In particular, particularly in a fast formation, the monopole source can be used to generate shear waves, with a fast and a slow shear polarization headwave being detected at monopole or dipole detectors. The "low frequency" shear headwaves can then be used in lieu of the low frequency flexural waves in determining whether a cross-over is found, as well as in finding the stress parameter $c_{456} 2T_{23}{}^{max}/c_{66}$.

While not preferred, it should also be appreciated that at high frequencies, the polarized flexural wave velocities approach the Scholte fluid-solid interface (i.e., surface) wave speeds. Thus, it is possible to replace the higher frequency dipole source with a surface wave transducer which may be mounted on a pad in contact with the borehole wall; i.e., on the fluid-solid interface. In this manner, surface waves are generated whose polarized head waves can be detected at the receivers. Based on the fact that the low frequency dipole source can be replaced by a shear wave monopole source in fast formations, while the higher frequency dipole source can be replaced by the surface wave transducer, it will be appreciated that, at least in certain types of formations, the invention can be carried out utilizing any of four combinations of source types: high and low frequency dipole sources; high frequency dipole source with low frequency shear monopole source; high frequency surface wave source with low frequency dipole source; and high frequency surface wave source with low frequency shear monopole source.

There have been described and illustrated herein apparatus and methods which utilize flexural waves or their low and high frequency equivalents for measuring formation parameters from which stress induced anisotropy in the formation can be identified. While particular embodiments of the invention have been described, it is not intended that the invention be limited thereto, as it is intended that the invention be as broad in scope as the art will allow and that the specification be read likewise. Thus, while particular sourcing frequencies have been described as preferred, it will be appreciated that other frequencies can be utilized, provided that velocity cross-over between the polarized slow and fast wave arrivals or dispersive arrivals can be detected. Also, while particular sourcing apparatus, receiver apparatus, and processing methods and apparatus have been described, it will be appreciated that other apparatus and methods can be utilized, provided that the polarized slow and fast wave arrivals can be detected. It will therefore be appreciated by those skilled in the art that yet other modifications could be made to the provided invention without deviating from its spirit and scope as so claimed.

We claim:

1. A method for associating formation anisotropy with stress in the formation by utilizing a borehole tool with at least one sonic source and at least one sonic detector in a borehole traversing the formation, the method comprising:

a) generating with the at least one sonic source a relatively low frequency signal and a relatively high frequency signal, where the relatively low frequency signal is sensitive to the formation distant from the borehole, and the relatively high frequency signal is sensitive to the formation adjacent the borehole;

b) detecting at the at least one sonic detector the slow and fast wave arrivals for the relatively low frequency signal and the relatively high frequency signal;

c) determining the azimuthal orientation of the maximum velocity of at least one of the slow and fast wave arrivals for at least one of the relatively low frequency signal and the relatively high frequency signal;

d) determining the velocities of the slow and fast waves for the relatively low frequency signal and for the relatively high frequency signal at the determined azimuthal orientation and at an orientation normal thereto; and e) associating formation anisotropy with stress in the formation if, at the determined azimuthal orientation, the velocity of the fast wave for one of the relatively high frequency signal and the relatively low frequency signal is greater than the velocity of the slow wave, and at the orientation normal to the determined azimuthal orientation, for the other of the relatively high frequency signal and relatively low frequency signal, the velocity of the fast wave is greater than the velocity of the slow wave.

2. A method according to claim 1, further comprising:
   if formation anisotropy is associated with stress in the formation,
   f) utilizing the velocity of said fast and slow waves of said relatively low frequency signal to find a value for a stress parameter of said formation.
3. A method according to claim 2, wherein:
   said stress parameter is $c_{456}2T_{23}^{max}/c_{66}$, where $c_{456}$ is a third order elastic constant of the formation $c_{66}$ is the formation shear modulus, and $T_{23}^{max}$ is the maximum shear stress magnitude at forty-five degrees relative to the maximum compressive stress in the formation which is determined by the azimuthal orientation of maximum velocity.
4. A method according to claim 3, wherein:
   $c_{456}2T_{23}^{max}/c_{66}$ is determined substantially according to $c_{456}2T_{23}^{max}/c_{66} = -\rho(v_{12}^2 - v_{13}^2)$ where $v_{12}$ and $v_{13}$ are the low frequency velocities for waves propagating substantially parallel said borehole with radial polarizations along directions orthogonal to each other, and $\rho$ is the formation mass density.
5. A method according to claim 1, wherein:
   said relatively low frequency has a center frequency located in a range between 1.5 KHz and 3.5 KHz, and said relatively high frequency has a center frequency located in a range between 8 KHz and 12 KHz.
6. A method according to claim 5, wherein:
   said relatively low frequency has a center frequency located at less than 2 KHz, and said relatively high frequency has a center frequency located at more than 9 KHz.
7. A method according to claim 1, wherein:
   said relatively low frequency and said relatively high frequency are chosen based on the diameter of the borehole in the formation.
8. A method according to claim 1, wherein:
   said at least one sonic source comprises a first sonic source at a relatively low frequency and a second sonic source at a relatively high frequency.
9. A method according to claim 8, wherein:
   said first sonic source is a first dipole source which generates a relatively low frequency flexural wave signal, and said second sonic source is a second dipole source which generates a relatively high frequency flexural wave signal.
10. A method for associating formation anisotropy with stress in the formation by utilizing a borehole tool with at least one sonic source and at least one sonic detector in a borehole traversing the formation, the method comprising:
    a) generating with the at least one sonic source a relatively low frequency signal and a relatively high frequency signal, where the relatively low frequency signal is sensitive to the formation distant from the borehole, and the relatively high frequency signal is sensitive to the formation adjacent the borehole;
    b) detecting at the at least one sonic detector the slow and fast wave arrivals for the relatively low frequency signal and the relatively high frequency signal;
    c) determining the azimuthal orientations of the maximum velocities for the slow and fast wave arrivals for both the relatively low frequency signal and the relatively high frequency signal; and
    d) determining whether the azimuthal orientation of the maximum velocity for one of the fast wave and slow wave arrivals for the relatively low frequency signal is substantially orthogonal to the azimuthal orientation of the maximum velocity for the same one of the fast wave and slow arrival for the relatively high frequency signal, and if so, associating formation anisotropy with stress in the formation.
11. A method according to claim 10, further comprising:
    if formation anisotropy is associated with stress in the formation,
    e) utilizing the velocity of said fast and slow waves of said relatively low frequency signal to find a value for a stress parameter of said formation.
12. A method according to claim 11, wherein:
    said stress parameter is $C_{456}2T_{23}^{max}/c_{66}$, where $c_{456}$ is a third order elastic constant of the formation $c_{66}$ is the formation shear modulus, and $T_{23}$ is the maximum shear stress magnitude at forty-five degrees relative to the maximum compressive stress in the formation which is determined by the azimuthal orientation of maximum velocity.
13. A method according to claim 12, wherein:
    $c_{456}2T_{23}^{max}/c_{66}$ is determined substantially according to $c_{456}2T_{23}^{max}/c_{66} = -\rho(v_{12}^2 - v_{13}^2)$ where $v_{12}$ and $v_{13}$ are the low frequency velocities for waves propagating substantially parallel said borehole with radial polarizations along directions orthogonal to each other, and $\rho$ is the formation mass density.
14. A method according to claim 11, wherein:
    said at least one sonic source comprises a first sonic dipole source which generates flexural waves at a relatively low center frequency located in a range between 1.5 KHz and 3.5 KHz, and a second sonic dipole source which generates flexural waves at a relatively high center frequency located in a range between 8 KHz and 12 KHz.
15. An apparatus for associating anisotropy of a formation traversed by a borehole with stress in the formation, comprising:
    a) a borehole tool having a sonic source means and a sonic detector means, said sonic source means for generating a relatively low frequency wave signal and a relatively high frequency wave signal, with said relatively low frequency wave signal being sensitive to the formation distant from the borehole, and said relatively high frequency wave signal being sensitive to the formation adjacent the borehole, and said sonic detector means for detecting said relatively low frequency wave signal as affected by the formation and said relatively high frequency wave signal as affected by the formation and generating outputs in response thereto;
    b) processing means coupled to said sonic source means for transforming said output signals into orthogonal slow and fast wave arrivals as a function of frequency such that the principal polarization directions and the magnitudes of the maximum and minimum wave velocities at those directions are determined at different frequencies; and
    c) means for indicating that the maximum velocity of the received relatively low frequency waves are in a first principal polarization direction, and the maximum velocity of the received relatively high frequency waves are in a second principal polarization direction which is substantially normal to the first principal direction, from which a determination is made that formation anisotropy is due to uniaxial stress in the formation.

16. An apparatus according to claim 15, wherein:
said sonic source means comprises a first sonic source which generates sonic waves of a relatively low frequency, and a second sonic source which generates sonic waves of a relatively high frequency.

17. An apparatus according to claim 16, wherein:
said first sonic source is a first dipole source which generates first flexural waves of a relatively low frequency, and
said second sonic source is a second dipole source which generates second flexural waves of a relatively high frequency.

18. An apparatus according to claim 16, wherein:
said first sonic source is a first monopole source which generates shear waves of a relatively low frequency, and
said second sonic source is a second dipole source which generates flexural waves of a relatively high frequency.

19. An apparatus according to claim 16, wherein:
said first sonic source is a dipole source which generates first flexural waves of a relatively low frequency, and
said second sonic source is a surface wave source which generates surface waves along the borehole wall of a relatively high frequency.

20. An apparatus according to claim 16, wherein:
said first sonic source is a first monopole source which generates shear waves of a relatively low frequency, and
said second sonic source is a surface wave source which generates surface waves along the borehole wall of a relatively high frequency.

21. An apparatus according to claim 15, wherein:
said relatively low frequency has a center frequency located in a range between 1.5 KHz and 3.5 KHz, and said relatively high frequency has a center frequency located in a range between 8 KHz and 12 KHz.

22. An apparatus according to claim 15, wherein:
said relatively low frequency and said relatively high frequency are chosen based on the diameter of the borehole in the formation.

23. An apparatus according to claim 15, wherein:
said processing means comprises means for finding a value for a stress parameter of said formation as a function of the velocities of the fast and slow waves of the relatively low frequency sonic wave signal.

24. An apparatus according to claim 23, wherein:
said stress parameter is $c_{456} 2 T_{23}^{max}/c_{66}$, where $c_{456}$ is a third order elastic constant of the formation $c_{66}$ is the formation shear modulus, and $T_{23}^{max}$ is the maximum shear stress magnitude at forty-five degrees relative to the maximum compressive stress in the formation.

25. An apparatus according to claim 24, wherein:
$c_{456} 2 T_{23}/c_{66}$ is determined substantially according to $c_{456} 2 T_{23}^{max}/c_{66} = -\rho(v_{12}^2 - v_{13}^2)$ where $v_{12}$ and $v_{13}$ are the low frequency velocities for waves propagating substantially parallel the borehole with radial polarizations along directions orthogonal to each other, and $\rho$ is the formation mass density.

26. An apparatus according to claim 15, wherein:
said means for indicating comprises plot generating means.

* * * * *